(12) United States Patent
Crews et al.

(10) Patent No.: US 8,404,033 B2
(45) Date of Patent: Mar. 26, 2013

(54) MULTI-TARGET SCRUBBER

(76) Inventors: Richard S. Crews, Cerritos, CA (US); John S. Crews, Huntington Beach, CA (US)

( * ) Notice: Subject to any disclaimer, the term of this patent is extended or adjusted under 35 U.S.C. 154(b) by 674 days.

(21) Appl. No.: 12/025,939

(22) Filed: Feb. 5, 2008

(65) Prior Publication Data

US 2008/0210096 A1 Sep. 4, 2008

Related U.S. Application Data

(60) Provisional application No. 60/899,766, filed on Feb. 5, 2007.

(51) Int. Cl.
*B01D 47/14* (2006.01)
*B01D 47/10* (2006.01)

(52) U.S. Cl. ............... 96/275; 96/290; 96/323

(58) Field of Classification Search ............ 96/256, 96/270, 271, 273, 275, 277, 280, 290, 297, 96/322, 323; 95/211, 224; 261/115, 116, 261/117, 118
See application file for complete search history.

(56) References Cited

U.S. PATENT DOCUMENTS

| | | | | |
|---|---|---|---|---|
| 2,410,293 A * | 10/1946 | Kitto | .................. | 96/403 |
| 2,786,742 A * | 3/1957 | McKinley et al. | .............. | 422/140 |
| 2,786,801 A * | 3/1957 | McKinley et al. | .............. | 208/157 |
| 3,385,030 A * | 5/1968 | Letvin | .................. | 95/216 |
| 3,523,762 A * | 8/1970 | Broughton | .................. | 422/638 |
| 3,994,438 A * | 11/1976 | Farmery | .................. | 239/7 |
| 4,110,088 A * | 8/1978 | Cold et al. | .................. | 95/211 |
| 4,117,886 A * | 10/1978 | Honaker | .................. | 166/259 |
| 4,828,768 A * | 5/1989 | Talmor | .................. | 261/116 |
| 5,269,967 A * | 12/1993 | Achgill | .................. | 95/233 |
| 5,279,646 A | 1/1994 | Schwab | | |
| 5,512,085 A | 4/1996 | Schwab | | |
| 5,759,233 A * | 6/1998 | Schwab | .................. | 95/8 |
| 6,019,818 A * | 2/2000 | Knapp | .................. | 95/187 |
| 6,174,498 B1* | 1/2001 | Jain et al. | .................. | 422/122 |
| 6,719,829 B1 | 4/2004 | Schwab | | |
| 6,953,495 B2* | 10/2005 | Schwab | .................. | 95/221 |
| 7,998,249 B2* | 8/2011 | Feher | .................. | 95/187 |
| 2002/0110511 A1* | 8/2002 | Klingspor et al. | .......... | 423/243.08 |
| 2004/0060996 A1* | 4/2004 | Jansohn et al. | .................. | 239/8 |
| 2004/0126295 A1 | 7/2004 | Joyce et al. | | |
| 2007/0009411 A1* | 1/2007 | Ray et al. | .................. | 423/210 |
| 2008/0276801 A1* | 11/2008 | Bell et al. | .................. | 95/69 |

FOREIGN PATENT DOCUMENTS

WO     8403641     9/1984

OTHER PUBLICATIONS

Schifftner, Kenneth C., Wet Scrubbers, 2nd Edition, Technomic Publishing Co., Inc., pp. 1-10.
Buonicore, Anthony J., Air Pollution Engineering Manual, Air and Waste Management Association, pp. 78-88.
Cooper, David C., Air Pollution Control, 3rd Edition, Waveland Press, pp. 115-118, 209-238.
Envirocare International, Inc., VenturiPak Gas Scrubbing Systems for Wastewater Applications, pp. 1-8, Envirocare International, Inc., American Canyon, CA, USA.
Envirocare International, Inc., MicroMist Scrubbing Systems, Sep. 2002, pp. 1-8, Envirocare Intenational, Inc., American Canyon, CA, USA.
Schutte & kOERTING, Gas Scrubbers, Dec. 15, 2005, Bulliten 7-S, pp. 1-14, Schutte & Koerting, Trevose, PA, USA.

* cited by examiner

*Primary Examiner* — Duane Smith
*Assistant Examiner* — Ives Wu
(74) *Attorney, Agent, or Firm* — Fish & Associates, PC

(57) ABSTRACT

A gas scrubber is presented. The gas scrubber comprises a nozzle that atomizes a liquid to form droplets. The droplets are preferably expelled from the nozzle in substantially a hollow cone spray pattern with a velocity of at least 4000 feet per minute. A stream of gas containing particulates that requires scrubbing interacts with the droplets. After the interaction, the gas-droplet combination impinges on a target. Preferred targets include droplets from a second nozzle, a ducting surface, or a throated passage.

17 Claims, 5 Drawing Sheets

MULTI-TARGET SCRUBBER

This application claims priority to provisional application having U.S. Ser. No. 60/899,766 filed Feb. 5, 2007. This and all other extraneous materials discussed herein are incorporated by reference in their entirety. Where a definition or use of a term in a reference, which is incorporated by reference herein, is inconsistent or contrary to the definition of that term provided herein, the definition of that term provided herein applies and the definition of that term in the reference does not apply.

FIELD OF THE INVENTION

The field of the invention is liquid scrubbers for flue gasses.

BACKGROUND

There are numerous gas scrubbers in existence, including for example scrubbers that operate upon flue gasses of power plants. When liquid absorbents are used, the liquid is sprayed into the gas stream either in a counter-current or a cross-current configuration. Problems arise because the gas tends to flow in a laminar fashion around the fluid droplets, which reduces effectiveness of the scrubbing.

Basic principles of scrubbing are set forth in Schiffner, Kenneth C., et al., "Wet Scrubbers", $2^{nd}$ Ed, Technomic Publishing Co., Inc., pp 1-10; Buonicore, Anthony J., et al., "Air Pollution Engineering Manual", Air and Waste Management Ass'n, pp 78-88; Cooper, David C. et al., "Air Pollution Control", $3^{rd}$ Ed, Waveland Press, pp 115-118, 209-238.

One solution is to direct the sprays against a target barrier through which the gas is flowing. Exemplary targeted barriers include plastic balls, and metal or ceramic saddle rings. Disruptions of the spray and gas streams caused by the barrier facilitate interaction of the spray and gas, but considerable energy is expended to force the gas through the barrier at sufficient velocity to provide adequate scrubbing.

Patent publication WO 84/03641 to Jones describes an improved rotary scrubber that uses a rotating mechanical atomizer. The rotating atomizer disperses high velocity water droplets in a radial direction that is cross-current to the gas stream flow. However, the water droplets can rob the gas of forward momentum reducing the ability for interaction with downstream targets.

Thus, there is still a need for apparatus and methods that facilitate scrubbing of gasses and liquid absorbents in a scrubber.

SUMMARY OF THE INVENTION

The present invention provides apparatus and methods in which a gas comprising particulates interacts with liquid droplets expelled from a nozzle.

In a preferred embodiment, a nozzle forms the droplets by expelling the liquid in a cone spray pattern, preferably a hollow cone, at an average velocity of at least 4000 feet per minute (FPM). A stream of gas containing particulates that require scrubbing interacts with the droplets. The combined mixture then impinges on a target.

All suitable nozzles are contemplated. However, nozzles that provide a hollow cone spray pattern are more preferred over solid cone spray patterns for some applications. Nozzles that provide a hollow cone spray pattern spay the liquid into a ring-shaped impact area where at least 90% of the liquid falls within the ring area. The droplets from neighboring nozzles act as a target for the stream of gas.

Other targets are also contemplated including a ducting surface, a pack-tower, or a target having a throated passageway.

Various objects, features, aspects and advantages of the inventive subject matter will become more apparent from the following detailed description of preferred embodiments, along with the accompanying drawings in which like numerals represent like components.

DETAILED DESCRIPTION

Preferred scrubber systems typically comprise multiple target stages strategically placed in series and that include spray nozzles and multiple target barrier objects. A scrubbing liquid is sprayed at elevated pressure in target stages to provide the required relative impact energy necessary impinge the fine particulate matter or react with acid gases within a particulate-containing gas that requires scrubbing. Example particulate-containing gases include flue gasses from a power plant containing NOx, SOx, particulate-matter, heavy metals, aerosols, odors, acids, or other pollutants can be scrubbed using the disclosed techniques.

Figure 1:
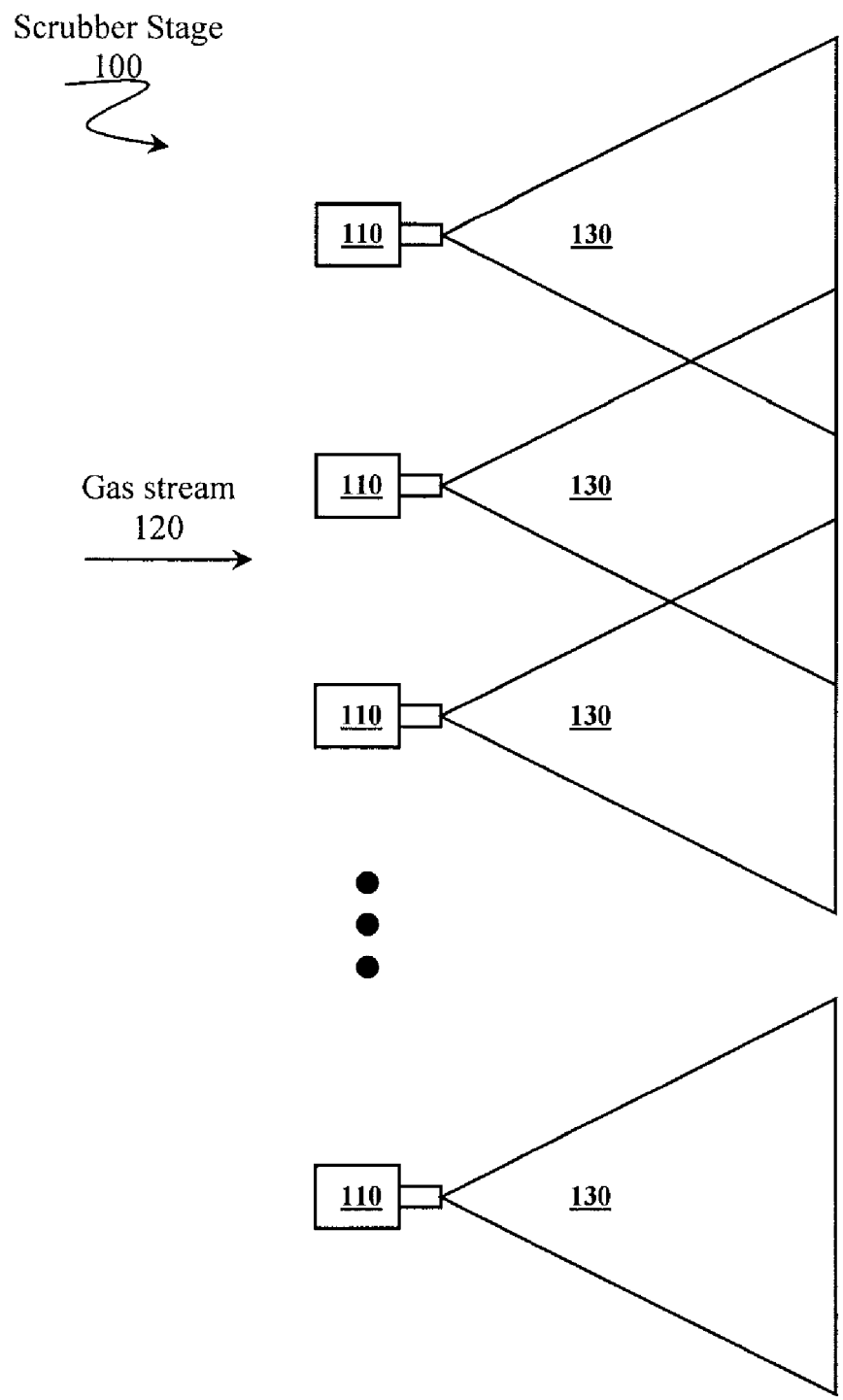
FIG. 1 is a schematic of an exemplary test scrubber stage where a target is droplets from a second nozzle.
Figure 2:
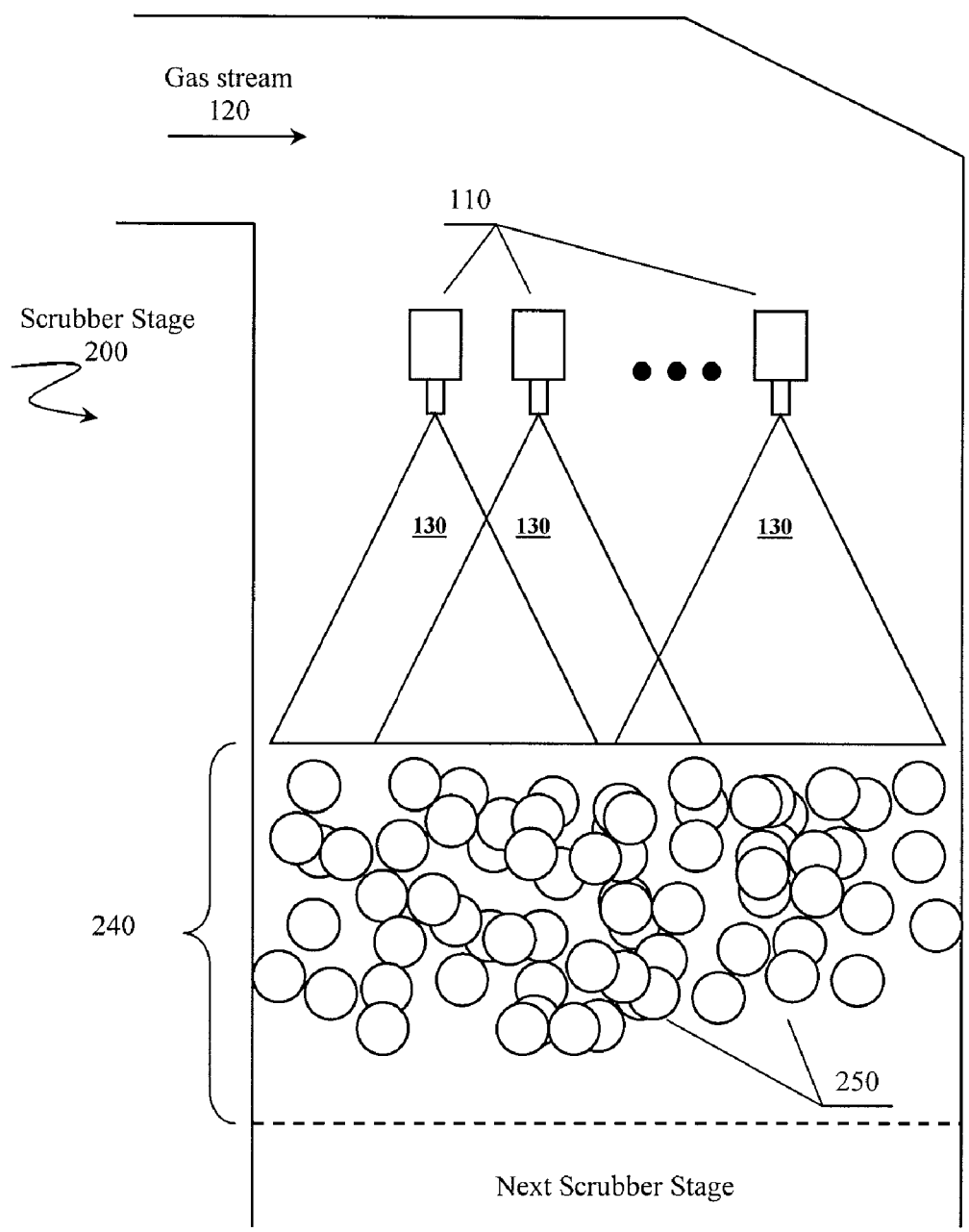
FIG. 2 is a schematic of an exemplary test scrubber stage where a target is pack-tower having a fill material.

In FIG. 1, scrubber stage 100 comprises at least one of nozzle 110 that expels a liquid into spray 130. As gas stream 120 enters scrubber stage 100, stream 120 interacts with a plurality of droplets within spray 130. The droplets carry the gas to a target comprising a plurality of droplets from spray originating from other nozzles. One should note that scrubber stage 100 can represent a single stage of a larger scrubber system where each stage can include one or more of stream 120, one or more of nozzle 110, or one or more scrubbing targets.

In a preferred embodiment, stream 120 comprises a particulate-containing gas that requires scrubbing and is oriented to interact with a plurality of droplets within spray 130. Stream 130 is oriented to have a velocity that is moderately parallel to, and in the same direction as the flow of spray 130. Stream 120 carries the gas in a direction that is no greater than 30 degrees off of a centerline of spray 130. More preferably, stream 120 carries the gas in a direction that is no greater than 10 degrees off of the centerline of spray 130.

The magnitude of the gas's velocity is preferably in the range from about 750 FPM to 1500 FPM, and more preferably no greater than 1000 FPM. However, it should be noted that it is contemplated that higher gas velocities (e.g. up to 3000 FPM) can also be used to for applications including scrubbing of $SO_2$, HCl, or $NH_4$. As the gas in stream 120 interacts with droplets in spray 130, the droplets carry the gas downstream to impinge on one or more targets.

Configuring scrubber stage 100 to have stream 120 and spray 130 flowing in the same general direction allows the combined gas-droplet mixture to impinge on other targets or other scrubber stages downstream with high velocity.

Impinging a target with high velocity ensures that gas and droplets mix more efficiently due to further atomization or turbulent flow caused by the target.

Spray 130 preferably comprises a substantially hollow cone spray pattern where droplets of liquid are concentrated into ring-shape as the liquid is expelled from nozzle 110. A hollow cone spray pattern provides for an efficient use of absorbent liquid by ensuring that most of the expelled liquid is concentrated near the outer surface of the cone where stream 120 can interact with droplets easily. If the pattern were a solid cone, then a portion of the liquid would be shielded from stream 120 resulting in an inefficient use of liquid. One should note that other spray patterns or their combinations are also contemplated including solid cones, flat spray, solid streams, or other patterns. For example, solid cone spray patterns provide acceptable performance when impacting a target media or packing.

All nozzles are contemplated, although a preferred nozzle 110 is configured to expel droplets of a liquid in a hollow cone spray pattern at high velocity. Suitable nozzles include Quick WhirlJet®, SpiralJet® or UniJet® hollow cone spray nozzles available from Spraying Systems Co.® (http://www.spray.com). The WhirlJet product line comprises a whirl jet nozzle providing acceptable atomization at low pressures and an effective airborne impingement. The SpiralJet product line comprises a spiral shaped nozzle having a precision impact blade angle that distributes droplets efficiently over well defined ring-shaped coverage area.

Nozzle 110 atomizes an absorbent liquid to form droplets in spray 130. Nozzle 110 is preferably configured to form droplets having average diameter in the range from about 100 to about 300 micron as measured using a Volume Medium Diameter (VMD). When a range is specified herein, the range is consider to be inclusive the range's endpoints. A VMD represents the droplet size where 50% of the liquid volume of liquid is in the form of droplets having diameters less than the VMD and 50% of the volume liquid volume is in the form of droplets having a diameter greater than the VMD.

Smaller droplets are preferred over larger droplets to increase the surface area to volume ratio of the droplets. Providing a maximal surface area per unit volume of liquid ensures that stream 120 interacts with spray 130 efficiently. However, one should note that if the droplets are too small (e.g. less than 100 microns), spray 130 will bloom and the liquid will quickly loose momentum. Conversely, if the droplets are too large (e.g. greater than 300 microns), spray 130 will drop too quickly reducing the efficiency.

In preferred embodiments, for example, the liquid is pressurized to between 30 PSI and 120 PSI, compared with less than 20 PSI in conventional systems. More preferred embodiments pressurize the liquid to between 60 PSI and 90 PSI, with still more preferred embodiments pressurizing the liquid to about 80 PSI.

Nozzles 110 can be arranged within scrubber stage 100 into nearly any configuration. A preferred configuration includes placing a plurality of nozzles 110 into an array where spray 130 from a first nozzle 110 overlaps spray 130 of a second nozzle 110. The array is configured with overlapping sprays 130 to ensure that stream 120 passes through spray 130 without passing through a gap. Although a preferred embodiment has an array of uniform nozzles 110, it is also contemplated that the array could include dissimilar nozzles.

One should note that overlapping sprays 130 impact each other with great velocity. As sprays 130 impinge on one another, a turbulent, boiling impact zone is formed providing a target reaction area for scrubbing stream 120. Each of spray 130 can become a target for gas in stream 120 carried by droplets from another spray.

Table 1 provides example nozzle characteristics for an array design to scrub a gas stream having a duct flow rate of 500 to 1000 FPM.

TABLE 1

| Nozzle Characteristic | Value |
|---|---|
| Nozzle Spray Pattern | Hollow Cone |
| Nozzle Type | Spiral or Whirl |
| Spray Angle | 60 to 120 Deg |
| Flow Rate | 10 to 50 gpm |
| Pressure | 40 to 120 PSI |
| Material | 316, 44OC, Plastic, Alloy |

Gas stream 120 has a relatively low flow rate (e.g. less than 1000 FPM) to provide a desired level of scrubbing. The rate at which droplets are expelled in spray 130 is preferably much greater (e.g. by a factor of at least two) than the flow rate of stream 120 to properly impinge fine particulate matter and to produce high velocity spray rebound in the overlapping impact zone. Higher differential velocities provides for a higher capture efficiency of particulate matter (e.g. PM10, PM2.5, or aerosols including those under 0.5 microns). These impact zones are formed as the concurrent sprays impact other sprays, packing, fill, barrier media (e.g. chevron, angled, or rectangular shaped impact media), or other target material.

A low gas velocity also provides for additional time related benefits. For example, a low gas flow rate allows for coalescence or adhesion of particle-to-particle or particle-to-droplet by mutual attraction, Brownian motion, or other random movement. Low gas velocity also ensures that the pressure drop from stage to stage is minimized.

Preferably, nozzle 110 expels droplets with a high velocity having an average velocity greater than 4000 FPM and more preferably having an average velocity greater than 8000 FPM. A high velocity spray carries the gas in stream 120 downstream to one or more downstream targets where further scrubbing can be achieved.

Spray 130 preferably includes absorbent liquid comprising water. Preferred liquids are at least 80% water by weight where the remaining portion of the liquid can includes other materials useful for scrubbing stream 120. For example, the remaining 20% of the liquid in spray 130 can include various reagents or other compounds. Contemplated compounds include particulates or heavy metal salts, surfactants, charged surfactants (e.g. anionic or cationic), liquids with hydrostatic charge, calcium carbonate for scrubbing $SO_2$, hydroxides, or other known scrubbing compounds.

It is also contemplated that additional scrubbing materials include dissolved or suspended solids entrained in the liquid. The solids can include reactive or inert solids as determined by the objectives of the scrubbing stage. When solids are entrained in the liquid, the solids preferably comprise at least 10% of the liquid by weight. Example solids include buffering agents, reagents containing magnesium, salts, or other known scrubbing solids.

In FIG. 2, scrubber stage 200 includes pack-tower target 240 having a fill material 250 used to enhance further scrubbing of stream 120 by interacting with spray 130. It is contemplated that scrubber stage 200 can be used as one or more stages within a larger scrubbing system.

Tower 240 preferably comprises a pack-tower. A pack-tower can be any suitable dimensions and can include filler material 250 packed in the tower. Preferably fill material 250 has a thickness of 8 inches to about 12 inches. Fill material 250 comprises a loose fill randomly disposed within tower 240 and allows stream 120 and spray 130 to enter tower 240. Example file material includes target balls preferably have a diameter of about 3.5", saddle rings having dimensions of about 1¾" long, by ¾" wide, by 1¼" high, mist eliminator chevrons, woven wire products, or other high-surface area, non-plugging media.

A typical penetration depth of spray 130 within tower 240 is about 12 inches with a preferred range of about 8 inches to about 18 inches. Deeper penetration is also contemplated. However, spray 130 looses much of its penetration energy at higher depths.

Figure 3:
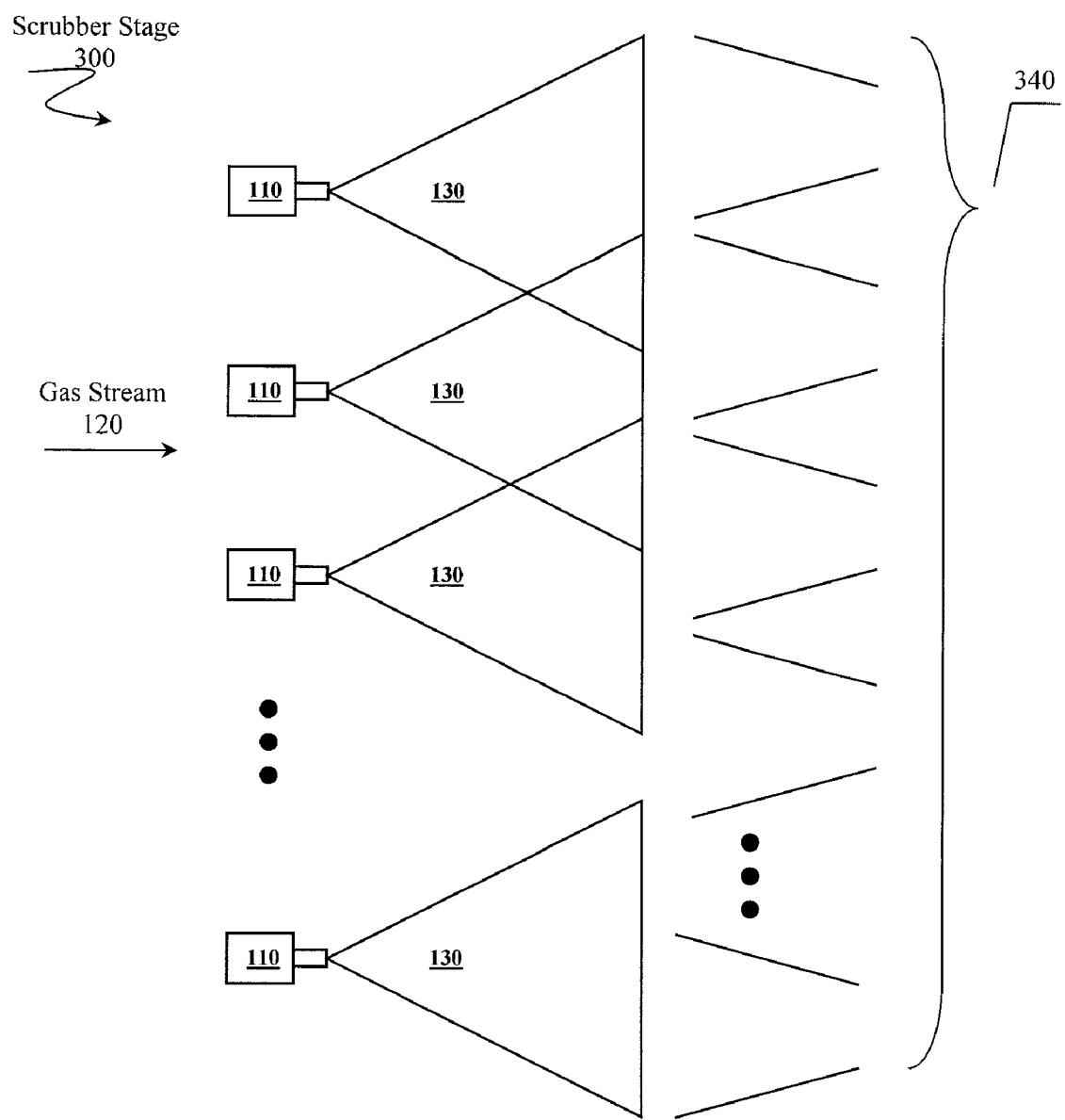
FIG. 3 is a schematic of an exemplary test scrubber stage where a target is a ducting surface.
Figure 4:
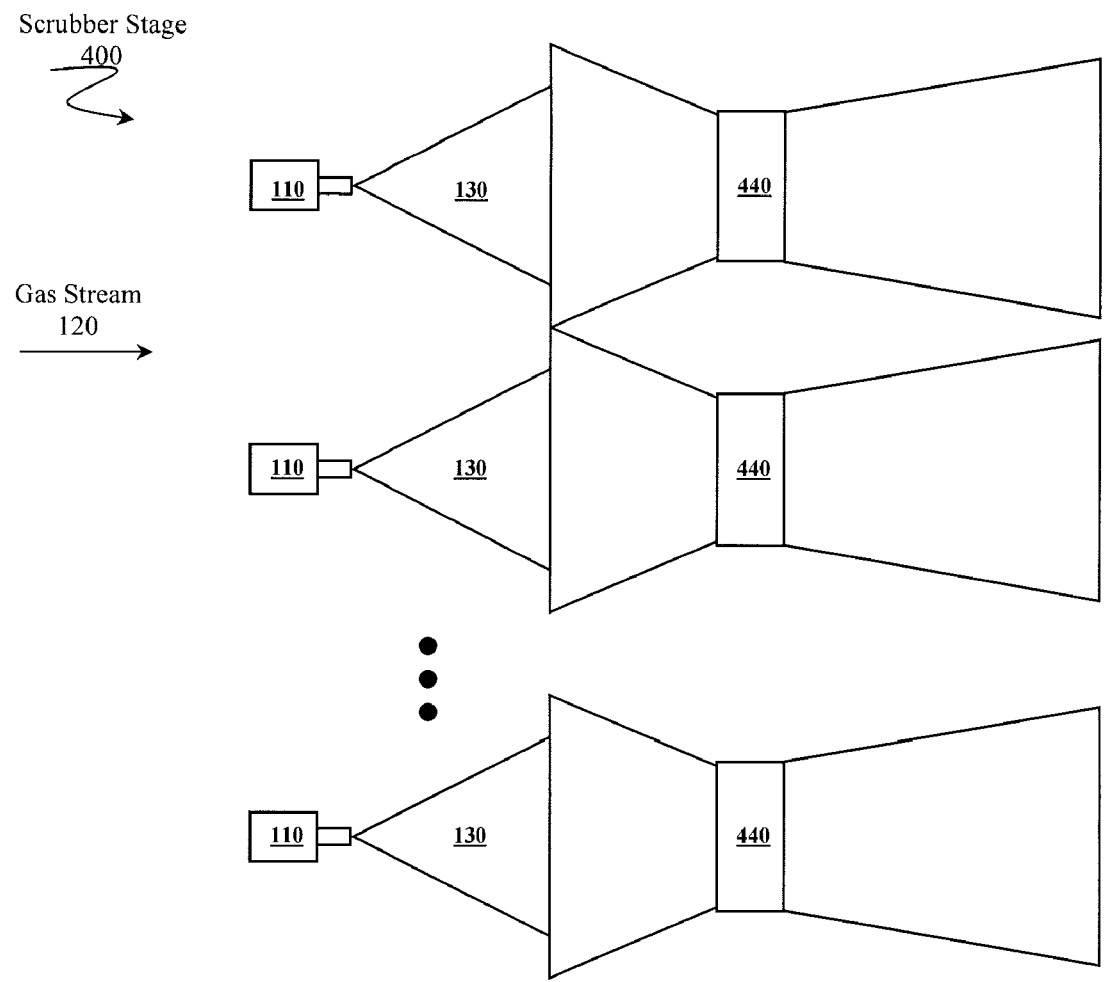
FIG. 4 is a schematic of an exemplary test scrubber stage where a target has a throated passageway
Figure 5:
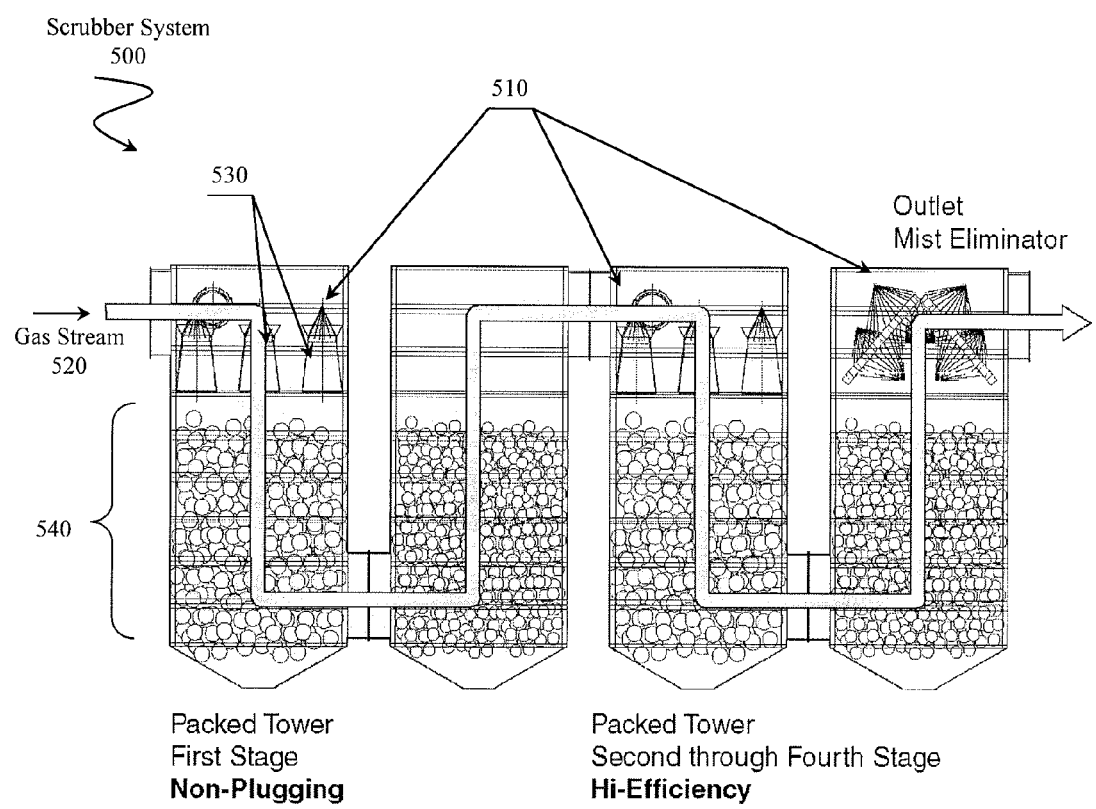
FIG. 5 is a schematic of an example four stage multi-stage scrubber having nozzles, pack-tower targets, and targets having throated passageways.

In FIG. 3, scrubber stage 300 includes one or more ducting targets 340. Gas stream 120 interacts with droplets expelled by nozzles 110 within spray 130. After the interaction, the combined gas-droplet mixture is funneled together via the ducting surfaces of ducting targets 340.

Ducting targets 340 preferably comprise one or more surfaces acting as baffles to further enhance scrubbing by forcing additional interaction between stream 120 and spray 130. Ducting targets 340 can comprise any suitable shape or orientation that provides for further interaction.

In FIG. 4, scrubber stage 400 includes throated targets 440 where throated targets 440 have a narrow passageway and form annular targets with spray 130. An annular target comprises a spray impact area on a section of material (e.g. metal, plastic, or other material) shaped to have a converging surface configured in approximately a cone-shape.

In a preferred embodiment having throated targets 440, each of nozzles 110 has a corresponding throated target 440. Throated target 440 is sized and dimensioned to have a narrowed throat that is smaller than the ring-shaped impact area of a hollow cone spray. Spray 130 impacts the entrance to the throat forming a curtain through which stream 120 must pass. The throat also forces addition interaction between droplets from spray 130 and stream 120 as they pass through the narrow passageway.

Throated targets 440 preferably have a converging conical surface, a throat, and a rear diffuser. The surface of the conical opening of throated targets 440 can be of any shape including a true cone, a pyramidal structure, a hexagonal structure, an octagonal structure, or other shape that forces the convergence of droplets from spray 130 and gas stream 120. Spray 130 impacts the conical surface forming an annular target due to the impact area of the spray ring. Spray 130 rebounds and continues with gas stream 120 through the narrowed throat to the rear diffuser which aids in reducing pressure drop within the scrubber duct. A preferred throated passageway is sized and dimensioned to eliminate pressure losses of greater than one inch of water within the scrubber ducts.

In FIG. 5 example four-stage scrubber 500 incorporates the elements disclosed above to scrub gas stream 520 of pollutants including NOx, SOx, odor, or other unwanted material. Scrubber system 500 comprises four stages, each including a pack-tower target 540. Nozzles 510 expel liquids to interact with stream 520. In the first and third stage, nozzles 510 spray liquid into one or more of throated targets 530.

Table 2 includes example nozzle characteristics for scrubber stages that have an annular target or a pack-tower scrubber having packing or other fill material. It should be noted that the characteristics in Table 2 are examples and that the characteristics (e.g. angle, flow, pressure, etc. . . . ) can be varied as desired to fit the requirements of the scrubber.

TABLE 2

| Nozzle Characteristic | Multiple Annular Targets | Packing, Fill, etc |
|---|---|---|
| Capacity | 3,000 CFM ea. Nominal | 500 to 1000 FPM duct velocity |
| Nozzle Spray Pattern | Hollow Cone | Full Cone |
| Nozzle Type | Spiral, Whirl, other | Spiral, Whirl, other |
| Spray Angle | 50 to 90 Deg | 60 to 120 Deg |
| Flow | 8 to 25 GPM | 10 to 50 GPM |
| Pressure | 80-120 PSI | 40 to 120 PSI |
| Material | 316, 440'2, Plastic, Alloy | 316, 44OC, Plastic, Alloy |

It is contemplated that a multi-stage scrubber can incorporate one or more stages where each stage includes desired scrubbing elements drawn from the disclosed subject matter. It should be noted that variation in scrubbing design characteristics from stage to stage also falls within the scope of the inventive subject matter. For example, the first stage of scrubber 500 could use water an absorbent liquid while the third stage could use a liquid containing a peroxide reagent. Additionally, nozzles 510 in the first stage could comprise hollow cone spray patterns where the forth stage uses full or solid cone spray patterns.

It should be apparent to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A gas scrubber comprising:

a nozzle that expels droplets of a liquid in a substantially hollow cone spray pattern at an average velocity of at least 4000 FPM;

a stream of a particulate-containing gas oriented parallel to and in a flow direction of the droplets such that the droplets carry the particulates in the flow direction;

a target comprising at least one of (1) a plurality of packing elements and (2) a ducting surface; and wherein the target is disposed such that the particulates impinge the target along with the droplets to thereby increase interaction of the stream with the droplets in an arrangement such that the interaction enhances scrubbing of the stream.

2. The scrubber of claim 1, wherein the nozzle is a spiral shaped nozzle.

3. The scrubber of claim 1, wherein the nozzle is a whirl jet nozzle.

4. The scrubber of claim 1, wherein the droplets are produced having a volume medium diameter in the range from about 100 microns to about 300 microns.

5. The scrubber of claim 1, wherein the nozzle expels the droplets at an average velocity of at least 8000 FPM.

6. The scrubber of claim 1, wherein the stream carries the gas at a velocity of no greater than 1000 FPM.

7. The scrubber of claim 1, wherein the stream carries the gas in a direction that is no greater than 30 degrees off a centerline of the hollow cone spray pattern.

8. The scrubber of claim 7, wherein the stream carries the gas in a direction that is no greater than 10 degrees a centerline of the hollow cone spray pattern.

9. The scrubber of claim 1, wherein the target comprises a plurality of droplets from a second nozzle.

10. The scrubber of claim 9, wherein the second nozzle has a spray pattern that overlaps the nozzle's hollow cone spray pattern.

11. The scrubber of claim 1, wherein the target comprises a ducting surface.

12. The scrubber of claim 1, wherein the target comprises pack-tower that has the plurality of packing elements.

13. The scrubber of claim 11, wherein the target comprises a converging throated passageway.

14. The scrubber of claim 13, wherein the throated passageway is sized and dimensioned to eliminate pressure losses of greater than one inch of water.

15. The scrubber of claim 1, wherein the liquid is at least 80% water.

16. The scrubber of claim 1, wherein the liquid comprises at least 10% by weight entrained solids.

17. The scrubber of claim 1, wherein the target comprises a plurality of packing elements.

* * * * *